United States Patent [19]
Mizoguchi

[11] Patent Number: 4,815,646
[45] Date of Patent: Mar. 28, 1989

[54] PINCH ROLLER ASSEMBLY WITH DUST PREVENTION MEANS

[75] Inventor: Sadao Mizoguchi, Toyohashi, Japan

[73] Assignee: Meiji Rubber & Chemical Co., Ltd., Tokyo, Japan

[21] Appl. No.: 836,545

[22] Filed: Mar. 5, 1986

[30] Foreign Application Priority Data

Mar. 8, 1985 [JP] Japan .............................. 60-33103[U]

[51] Int. Cl.⁴ ............................................. B65H 20/00
[52] U.S. Cl. .................................... 226/194; 384/488; 384/480
[58] Field of Search ................ 226/190, 194; 384/477, 384/480, 488, 505

[56] References Cited

U.S. PATENT DOCUMENTS

| 1,105,268 | 7/1914 | Gohlke | 384/480 |
| 1,856,547 | 5/1932 | Gotthardt | 384/488 |
| 2,073,963 | 3/1937 | Edwards | 384/477 |
| 3,447,394 | 6/1969 | Wagner et al. | 384/505 X |
| 3,801,171 | 4/1974 | Rozentals | 384/505 X |
| 4,344,659 | 8/1982 | Shimano | 384/480 |
| 4,348,067 | 9/1982 | Tooley | 384/480 |

Primary Examiner—Lenard A. Footland
Attorney, Agent, or Firm—Roberts, Spiecens & Cohen

[57] ABSTRACT

This invention relates to a compact roller used as a tape recorder pinching roller for such as cassette tape recorders and VTR's or as a paper feeding roller for such as copying machines, facsimiles and printers.

5 Claims, 1 Drawing Sheet

PINCH ROLLER ASSEMBLY WITH DUST PREVENTION MEANS

BACKGROUND OF THE INVENTION

Such roller as a pinching roller used for such tape recorders as, for example, cassette tape recorders and VTR's has been conventionally formed as shown in FIG. 3.

That is to say, in the drawing, the reference numeral 11 denotes a holder, 12 denotes a shaft, 13 denotes a spacer, 14 denotes an inner sleeve, 15 denotes a radial ball bearing, 16 denotes an outer sleeve made of brass, aluminum or the like and 17 denotes a roller body made of rubber or the like.

In such conventional example, it has been common to provide a so-called double sealing structure by arranging sealing members 18 on both sides of the interior of the radial ball bearing 15 in order to prevent dusty fine powder such as rubber scraped off by the friction of the tape or the like in sliding contact with the surface of the roller body 17, from entering the radial ball bearing 15 through the path indicated by the arrows in FIG. 3.

However, the above described conventional example has deficiency that the cost of the radial ball bearing 15 having sealing members 18 for preventing dust entry is high.

SUMMARY OF THE INVENTION

The present invention seeks to overcome the above mentioned deficiency and its object is to provide a roller wherein the formation of the radial ball bearing part is simplified, the manufacturing and assembling operations are made simple and the cost is reduced.

DESCRIPTION OF THE PREFERRED EMBODIMENTS

Figure 1:
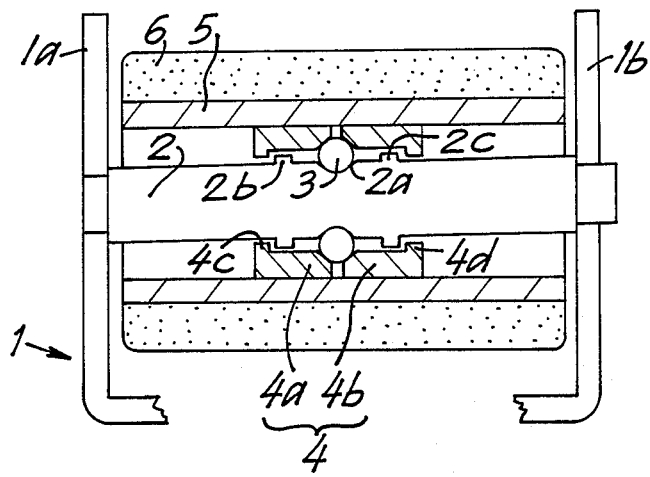
FIG. 1 is a sectional view of a first embodiment of a roller according to the present invention.

In the first embodiment of the present invention shown in FIG. 1, a columnar shaft 2 is supported between side pieces 1a and 1b of a holder 1, a hemispherical groove is made by cutting or the like in the middle of the shaft 2 to form a ball receiving part 2a and flange-shaped dust preventing projections 2b and 2c are formed over the entire periphery respectively on both sides of the ball receiving part 2a.

A plurality of balls 3 are provided on the outer periphery of the ball receiving part 2a and are held by a substantially ring-shaped ball pressing member 4 arranged outside the balls 3. The ball pressing member 4 consists of two first and second tapered ball pressing members 4a and 4b, the members 4a and 4b being tapered, for example, substantially at 45 degrees at the inner end parts to contact and favorably hold the balls 3 and being provided with dust preventing projections 4c and 4d located respectively outside the projections 2b and 2c and extending toward the shaft 2. Slight clearances are formed respectively between the projections 2b and 2c and the inner peripheries of the first and second ball pressing members 4a and 4b and between the projections 4c and 4d and the outer periphery of the shaft 2. Further, the ball pressing member 4 is fixed to the inner peripheral surface of a cylindrical outer sleeve 5 arranged outside it. This outer sleeve 5 is, for example, die-cast and is fitted with a roller body 6 made of rubber on its peripheral surface.

In assembling the elements, first of all, the roller body 6 is fitted on the outer peripheral surface of the outer sleeve 5 and is ground in advance on the outer peripheral surface. The first or second ball pressing member 4a or 4b on one side is pressed into a proper position on the inner periphery of the outer sleeve 5 and is fixed by a screwing means or binder. Then, the shaft 2 is inserted and set in a proper position with the already arranged first or second ball receiving member 4a or 4b through a proper jig (not illustrated). Then, a proper number of free balls 3 are put in together with grease or oil and are rotatably arranged between the outer periphery of the shaft 2 and the ball pressing member 4a or 4b on one side. Then the second or first ball pressing member 4b or 4a on the other side is pressed in and is fixed in a proper position on the inner periphery of the outer sleeve 5 by a screwing means or binder. While one side piece 1b of the holder 2 is bent and opened at the base end, the shaft 2 is locked at one end with a through hole of the other side piece 1a and then the above mentioned side piece 1b is bent back and is locked with the shaft 2 at the other end to easily assemble them.

In the thus formed present invention, as no radial ball bearing is required, the cost can be substantially reduced. Such fine powder or dust of the rubber or the like as is slightly scraped off by a tape or the like running on the surface of the roller body 6 can be positively prevented by the dust preventing projections provided on both sides of the balls 3 from entering the ball part. Further, the component parts are so few and the respective members are of such comparatively simple forms that the assembling is easy.

Figure 2:
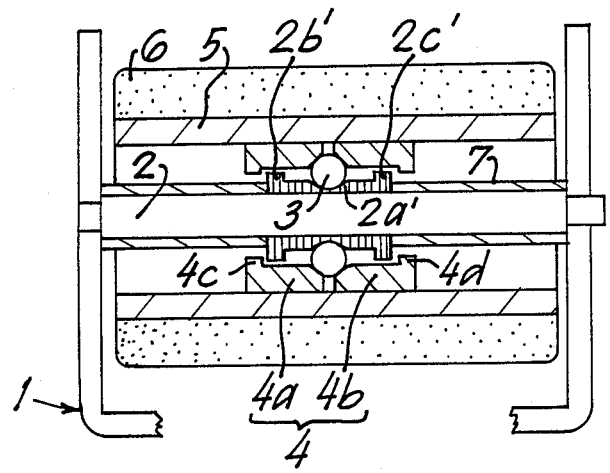
FIG. 2 is a sectional view of a second embodiment of the present invention.
Figure 3:
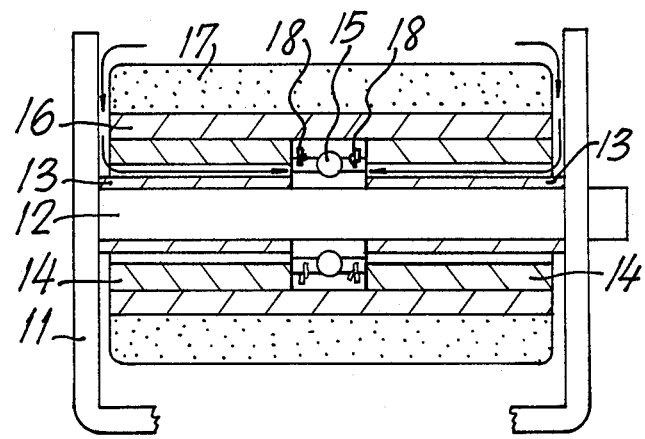
FIG. 3 is of a conventional embodiment.

The second embodiment of the present invention shown in FIG. 2 is characterized in that the shaft 2 is left columnar, a ball receiveing part 2a' which is a separate member corresponding to the inner race of the radial ball bearing is provided substantially in the middle of the shaft 2, the balls 3 are arranged between this ball pressing member 4 and cylindrical spacers 7 are provided respectively on both sides of the above mentioned ball receiving part 2a'.

In this embodiment, in assembling the roller, first of all, the roller body 6 is fitted to the outer sleeve 5, the first or second ball pressing member 4a or 4b on one side is secured as by being pressed in a proper poseition on the inner periphery of the outer sleeve 5, then the ball receiving part 2a' is positioned in the inner peripheral part of the already incorporated first or second ball pressing member 4a or 4b through a jig (not illustrated), a proper number of free balls 3 are inserted together with grease or oil, then the second or first ball pressing member 4b or 4a on the other side is pressed in and is fixed to the inner periphery of the outer sleeve 5 by a screwing means or binder, then the shaft 2 is inserted through the hole of the ball receiving part 2a' and the assembly completed by inserting the cylindrical spacers 7 from both directions may be fixed to the holder 1.

By the way, a hemispherical groove to contact, hold and support the balls 3 is formed substantially in the middle of the ball receiving part 2a' and dust preventing projections 2b' and 2c' positioned respectively inside the projections 4c and 4d are provided respectively at both ends on the outer periphery of the ball receiving part 2a'.

In this embodiment, there is an advantage that the shaft 2 is not required to be worked.

As in the above, according to the present invention, there are effects that the formation is comparatively simple, the assembling is easy, the expensive radial bearing having conventional sealing members is not required and therefore the cost can be that much reduced.

I claim:

1. A pinch roller assembly comprising a shaft having opposite end portions, a holder securing said shaft at said end portions, said shaft having a central region located substantially midway between said end portions which are secured to said holder, said shaft having a cylindrical peripheral surface and being provided with an arcuate recess therein in said central region, a plurality of balls seated in said recess around said shaft, a pair of axially spaced annular ball-pressing members surrounding said shaft with clearance, said ball-pressing members having opposed inner end portions facing one another in spaced relation, said inner end portions having ball engaging surfaces, engaging said balls on the outer peripheries thereof to hold said balls in said recess, an outer cylindrical sleeve surrounding said shaft, said outer sleeve having an inner peripheral surface facing said shaft, said ball-pressing members being secured to said inner peripheral surface of said outer sleeve, a pinch roller body securely fitted on said outer sleeve on the outer periphery thereof, the shaft and the ball-pressing members each including integral annular projections projecting radially towards one another at axial locations on opposite sides of the balls, said annular projections being slightly axially spaced from one another, the projections on the ball-pressing members facing said outer peripheral surface of the shaft while the projections on the shaft face said ball-pressing members to form means for preventing dust entry to the balls.

2. A pinch roller assembly as claimed in claim 1 wherein said projections on said ball-pressing members are disposed at ends thereof remote from one another.

3. A pinch roller assembly as claimed in claim 1 wherein said projections on said shaft are disposed in spaced relation on opposite sides of said annular groove.

4. A pinch roller assembly as claimed in claim 1 wherein said projections on said ball-pressing members are disposed at ends thereof remote from one another and said projections on said shaft are disposed on opposite sides of said annular groove.

5. A pinch roller assembly as claimed in claim 1 wherein said ball engaging surfaces on said inner end portions of the ball-pressing members are tapered surfaces of substantially 45°.

* * * * *